(12) United States Patent
Vollebregt et al.

(10) Patent No.: US 11,925,986 B2
(45) Date of Patent: Mar. 12, 2024

(54) METHOD FOR MANUFACTURING A BLADE COMPRISING A BATHTUB TIP INTEGRATING A SMALL WALL

(71) Applicant: SAFRAN AIRCRAFT ENGINES, Paris (FR)

(72) Inventors: Matthieu Jean Luc Vollebregt, Asnieres sur Seine (FR); Coralie Guerard, Colombes (FR); Patrick Emilien Paul Emile Huchin, Tessancourt sur Aubette (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 338 days.

(21) Appl. No.: 15/741,146

(22) PCT Filed: Jun. 27, 2016

(86) PCT No.: PCT/FR2016/051580
§ 371 (c)(1),
(2) Date: Dec. 29, 2017

(87) PCT Pub. No.: WO2017/001751
PCT Pub. Date: Jan. 5, 2017

(65) Prior Publication Data
US 2018/0193920 A1    Jul. 12, 2018

(30) Foreign Application Priority Data
Jun. 29, 2015   (FR) ...................................... 15 56065

(51) Int. Cl.
*B22F 5/04*       (2006.01)
*B22F 3/24*       (2006.01)
(Continued)

(52) U.S. Cl.
CPC ................ *B22F 5/04* (2013.01); *B22F 10/25* (2021.01); *B22F 10/66* (2021.01); *B23P 15/02* (2013.01);
(Continued)

(58) Field of Classification Search
CPC .......... B22F 3/105; B22F 3/1055; B22F 5/04; B22F 2999/00; B22F 2998/10;
(Continued)

(56) References Cited

U.S. PATENT DOCUMENTS

| 5,738,491 A | 4/1998 | Lee et al. |
| 2008/0044289 A1 | 2/2008 | Klasing et al. |

(Continued)

FOREIGN PATENT DOCUMENTS

| EP | 1895099 A2 | 3/2008 |
| EP | 2639405 A1 | 9/2013 |

(Continued)

OTHER PUBLICATIONS

International Search Report for International Application No. PCT/FR2016/051580 dated Sep. 20, 2016.
(Continued)

*Primary Examiner* — Woody A Lee, Jr.
*Assistant Examiner* — Justin A Pruitt
(74) *Attorney, Agent, or Firm* — Pearne & Gordon LLP

(57) ABSTRACT

The invention relates to a method for manufacturing a turbine engine blade (16) including an active-surface wall (17) and a passive-surface wall (18) separated from one another, this blade (16) including a tip that has a closing wall grouping together the active-surface (17) and passive-surface (18) walls in the region of this tip to define the bottom (23) of a bathtub tip shape located at the tip of the blade, the method comprising a moulding step implementing a core defining the bathtub tip shape. According to the invention,
(Continued)

there is a step of adding metal to the bottom (23) of the bathtub tip by means of a Direct Laser Additive Manufacturing (CLAD) method, to deposit material onto the bottom of the bathtub tip to form therein an inner partition (28) supported by the bottom thereof (23).

17 Claims, 2 Drawing Sheets

(51) Int. Cl.
  B22F 5/00      (2006.01)
  B22F 10/25     (2021.01)
  B22F 10/66     (2021.01)
  B23H 9/10      (2006.01)
  B23P 15/02     (2006.01)
  B29C 64/153    (2017.01)
  B33Y 10/00     (2015.01)
  B33Y 80/00     (2015.01)
  F01D 5/20      (2006.01)

(52) U.S. Cl.
  CPC .............. B29C 64/153 (2017.08); F01D 5/20 (2013.01); B22F 2003/247 (2013.01); B22F 2005/005 (2013.01); B22F 2998/10 (2013.01); B22F 2999/00 (2013.01); B23H 9/10 (2013.01); B33Y 10/00 (2014.12); B33Y 80/00 (2014.12); F05D 2230/31 (2013.01); F05D 2240/307 (2013.01); Y02P 10/25 (2015.11); Y02T 50/60 (2013.01)

(58) Field of Classification Search
  CPC ......... B22F 2005/005; B22F 2003/247; B22C 9/10; B22C 9/103; B29C 64/153; B33Y 10/00; B33Y 80/00; F04D 29/384; F04D 29/388; F01D 5/00; F01D 5/14; F01D 5/147; F01D 5/20; F01D 5/187; B28B 1/001; B23P 15/04; B23H 9/10; Y02P 10/295; Y02T 50/673; F05D 2240/307; F05D 2230/31
  USPC ........................................................ 416/224
  See application file for complete search history.

(56) References Cited

U.S. PATENT DOCUMENTS

| 2009/0180896 | A1  | 7/2009 | Brittingham |
| 2013/0175242 | A1* | 7/2013 | Lancaster-Larocque .................... H01F 41/0253 219/69.12 |
| 2014/0099193 | A1* | 4/2014 | Zhang ...................... F01D 5/20 415/178 |
| 2015/0034266 | A1  | 2/2015 | Bruck et al. |
| 2016/0265366 | A1* | 9/2016 | Snyder .................... F01D 5/187 |
| 2017/0056963 | A1* | 3/2017 | Bartels ................. B22C 1/2253 |

FOREIGN PATENT DOCUMENTS

| EP | 2716870 A1 | 4/2014 |
| WO | 2015069411 | 5/2015 |

OTHER PUBLICATIONS

Written Opinion for International Application No. PCT/FR2016/051580 dated Sep. 20, 2016.
Preliminary French Search Report French Application No. FR 1556065 dated May 2, 2016.

* cited by examiner

METHOD FOR MANUFACTURING A BLADE COMPRISING A BATHTUB TIP INTEGRATING A SMALL WALL

This application is a national phase entry of International Application No. PCT/FR2016/051580 filed on Jun. 27, 2016, which claims priority to French Patent Application No. 15 56065 filed on Jun. 29, 2015. The contents of these applications are incorporated herein by reference in their entireties.

TECHNICAL FIELD

The invention relates to the manufacturing of a turbine engine-type aircraft engine, such as, for example, a turboreactor or a turbopropeller.

PRIOR ART

In such an engine, referenced by 1 in FIG. 1, air enters into an inlet sleeve 2 to pass through a blower comprising a series of rotating blades 3 before being split into a central primary flow and a secondary flow surrounding the primary flow.

The primary flow is compressed by turbines 4 and 6 before reaching a combustion chamber 7, after which it is expanded, passing through the turbines 8, before being released by generating a thrust. The secondary flow is directly propelled by the blower to generate additional thrust.

Each turbine 8 comprises series of blades oriented radially and regularly separated around a rotating blade AX supported by an external casing 9 surrounding the unit.

The cooling of the blades is ensured by circulating the air collected upstream of the combustion in each blade and entered at the base of the blade, this air being released by bores crossing the walls of these blades.

Such a blade, which is referenced by 11 in FIG. 2, comprises a base P, by which a rotating body is attached, and a blade 12 supported by this base P, the base and blade being separated by a platform 13.

The blade 12 has a non-straight shape, spiralling around an axis EV, known as the spanwise axis, which is perpendicular to the axis AX. It comprises a base by which it is connected to the platform 13 and which extends radially up to a tip S which is the free end of this blade. The two main walls of the blade are the active-surface wall 14 and the passive-surface wall thereof, which are separated from one another.

The tip S of the blade 11 comprises a closing wall, perpendicular to the direction EV, and which connects the active-surface and passive-surface walls. This closing wall, not visible in FIG. 2, withdraws towards the axis AX in relation to the free ends of the active-surface and passive-surface walls. It jointly defines, with these edges, a hollow, open section, in the direction opposite to the axis AX, called a bathtub tip, which is located at the top of the blade, in other words, at the tip thereof.

Such a blade is manufactured by moulding a metal material, by using, in particular, a core comprising a first core and a second core to define, on the one hand, the internal space of the blade body, and on the other hand, the internal space of the bathtub tip. These two cores are separated from one another along the spanwise direction EV by a small distance.

The increased performance needs lead to optimising the cooling of the bathtub tip, for example, by providing small wall partitions or inner partitions, supported by the bathtub tip bottom. These partitions or ribs aim to optimise the aerodynamism in the bathtub tip, to improve cooling at the tip of the blade, in particular, by limiting leaks from the active surface to the passive surface.

Adding such ribs or partitions significantly complicates the development of the second core. Indeed, this is manufactured with a core box, in other words, a two-section mould which opens by moving one away from the other, but along a stripping direction which extends in a normal plane to the spanwise axis of the blade.

The limitation of this stripping direction which is the result of manufacturing necessities, means that the slots defining the ribs for the bottom of the bathtub tip cannot be provided at the end of the second core. Such slots would constitute undercut areas making stripping the second core impossible during the manufacture thereof, because of their orientations being different from the stripping direction.

A possibility consists of manufacturing the second core in several ceramic sections, assembled on top of one another by gluing. This significantly complicates manufacture, and consequently tends to increase the rejection rate, further to leading to a core having insufficient robustness.

The aim of the invention is to provide a manufacturing method enabling to produce a large variety of internal shapes at the level of the bathtub tip, without disadvantaging the rejection rate.

DESCRIPTION OF THE INVENTION

To this end, the invention aims for a method for manufacturing a turbine engine blade including an active-surface wall and a passive-surface wall, separated from one another, this blade including a tip that has a closing wall grouping together the active-surface and passive-surface walls in the region of this tip to define a bottom of a bathtub tip shape located at the tip of the blade, the method comprising a moulding step implementing a core (see e.g., the core 34 shown schematically in FIG. 3) defining the bathtub tip shape, characterised in that it comprises a step of adding metal to the bottom of the bathtub tip by means of Additive Manufacturing, by adding metal, in particular, by depositing metal powder, to deposit the material on the bottom of the bathtub tip, to constitute in this bathtub tip, an inner partition supported by the bottom thereof.

According to the invention, the Additive Manufacturing method which is usually used to fully constitute the geometry of a part is utilised here to complete a part that comes from casting. With this solution, any partition shape can be constituted on the bathtub tip bottom, without affecting the moulding operation or the shape of the cores to implement.

Different Additive Manufacturing methods can be used, like the Direct Laser Additive Manufacturing method, generally referred to by the trademark CLAD, the method known as Laser Metal Deposition generally referred to by the acronym LMD, the method known as Direct Metal Deposition generally referred to by the acronym DMD, or the method known as Direct Laser Metal Deposition generally referred to by the acronym DLMD.

The invention also aims for a method thus defined, comprising, after the step of adding material, a machining step, with a method such as a method of machining by electroeroding the deposited material.

The invention also aims for a method thus defined, wherein the material is deposited so as to extend from an edge of the active-surface wall, to an edge of the passive-surface wall.

The invention also relates to a turbine engine blade obtained with the method thus defined.

The invention also relates to a turbine engine comprising a blade thus defined.

DETAILED DESCRIPTION OF SPECIFIC EMBODIMENTS

Figure 1:
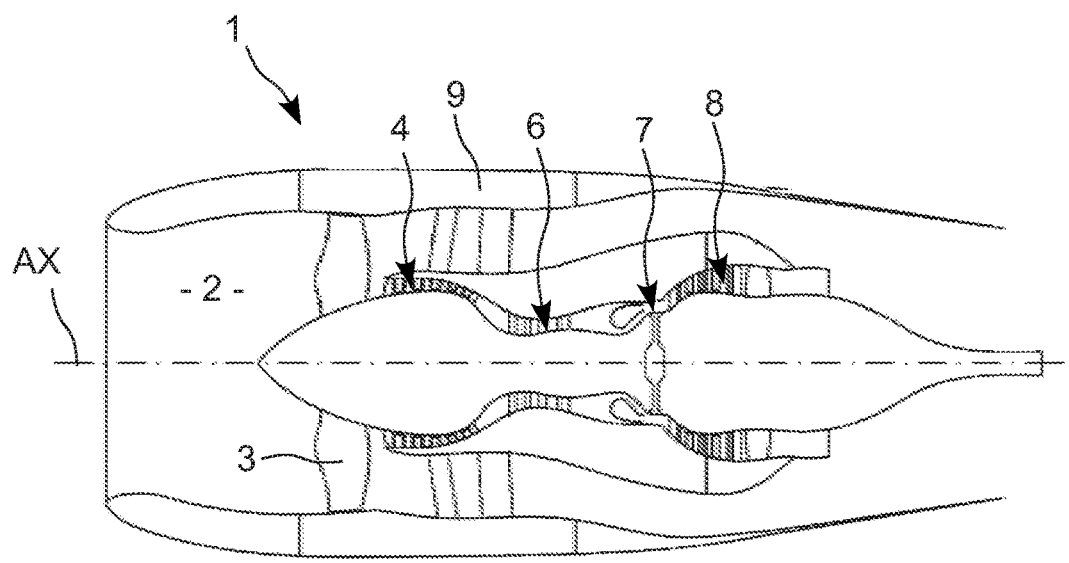
FIG. 1 already defined is an overview of a double flow turboreactor represented in a side cross-section.
Figure 2:
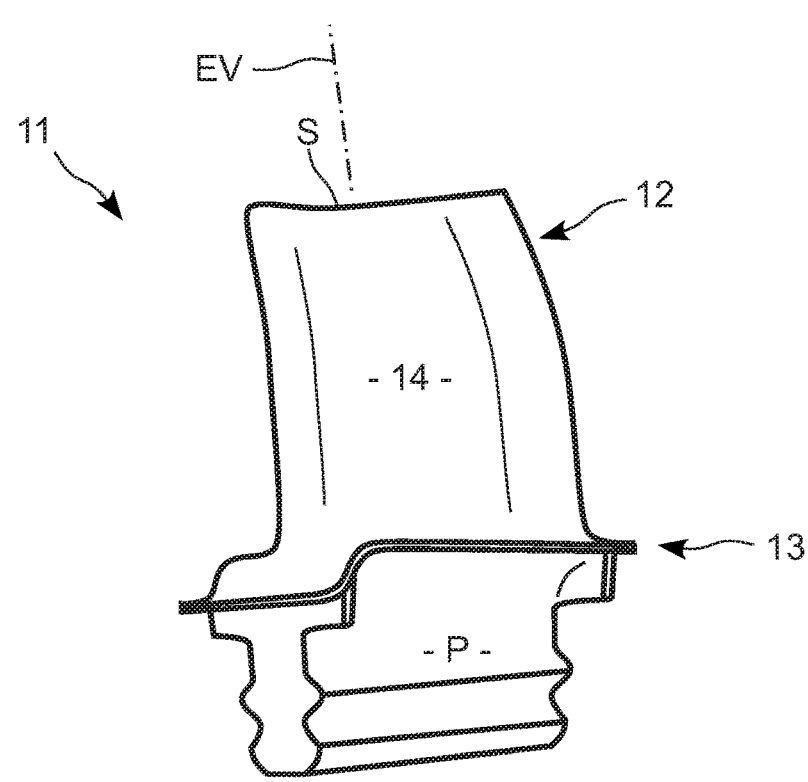
FIG. 2 already defined is an overview of a reactor blade.
Figure 3:
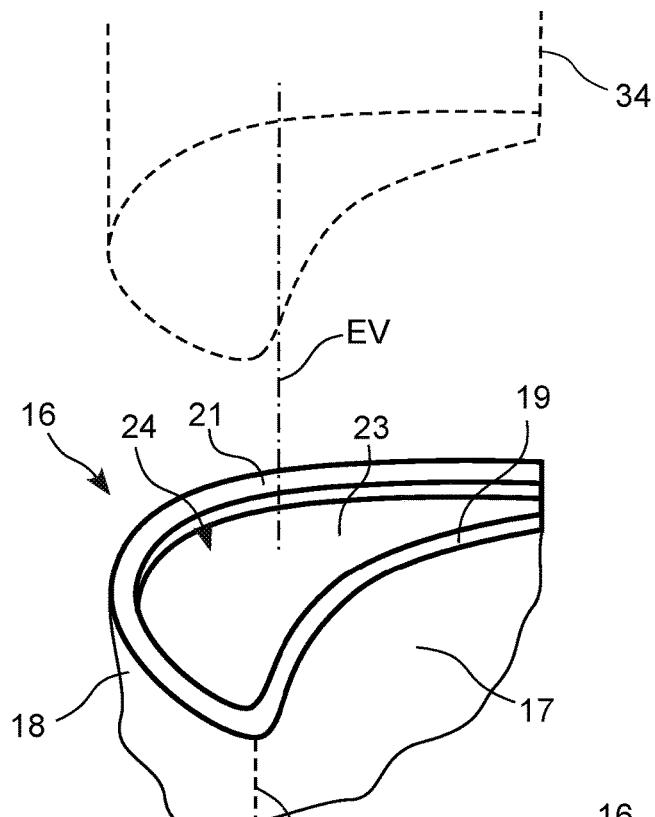
FIG. 3 is a partial perspective view of a blade bathtub tip that comes from casting.
Figure 4:
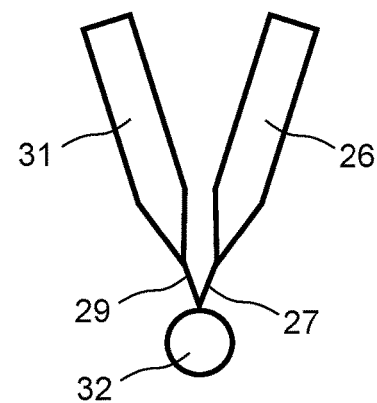
FIG. 4 is a schematic representation of the method used in the invention to add material on the bottom of the blade bathtub tip.

As can be seen in FIG. 3, a blade 16 such as coming from casting, comprises an active-surface wall 17 and a passive-surface wall 18 which substantially extend along the spanwise direction EV of this blade, and of which the top edges, referenced by 19 and 21, define the tip of this blade 16.

These active-surface and passive-surface walls 17 and 18 are separated from one another, while being connected to one another, on the one hand, at the level of the leading edge of the blade, referenced by 22, and on the other hand, at the level of the trailing edge of the blade which does not appear in the figure, these two edges extending almost parallel to the spanwise direction EV.

These walls are again connected to one another at the blade tip by a wall known as a closing wall, referenced by 23, and which extends perpendicularly to the spanwise direction, while being remote along the spanwise direction by a certain height in relation to the tips of the edges 19 and 21. The edges 19 and 21 thus go beyond the closing wall that they surround, to define with it, the bathtub tip 24 of the blade tip, of which they constitute the edges, and of which the closing wall constitutes the bottom.

The basis of the invention is to use a method known as an Additive Manufacturing method, to add metal to the bottom of the bathtub tip of the blade, such as coming from casting, so as to form an inner partition in this bathtub tip. The method used is a method that fuses metal powders by a laser beam, depositing in successive layers. Other metal deposit methods can be considered.

Such a method, which is usually referred to by the trademark CLAD, namely the Direct Laser Additive Manufacturing method, consists of using equipment 26 to generate a laser beam 27 to fuse on a substrate, which is here the bottom 23 of the bathtub tip 24, one or several metal powders 29 added by a nozzle 31, so as to successively constitute deposit layers 32 of a metal material. This nozzle is a coaxial nozzle, able to carry out the homogenous injection of metal powders through a laser beam.

With this method, powders fused by the laser constitute a homogenous and dense deposit on the surface or layer which supports them, which is itself also fused during the process. As there is no contact, in particular, between the nozzle and the substrate, the method is exempt from wear and tear. Successive deposits or stacks are protected all throughout the method, by an inactive gas to counter oxidation problems.

This method enables deposits to be made, by targeting with a certain precision, the places where the material is added. It is also possible to use two metals from different additions to produce, if necessary, an alloy of evolving proportions according to the height. This enables to optimise different aspects, like mass, adhesion with the substrate, in other words, dilution and porosity, as well as abradability, abrasivity, dilatation or other properties.

Generally, the material deposited is that chosen according to the substrate to have a suitable mechanical stability, abradability, as well as compatibility with the substrate, which are suitable, in particular, concerning dilution and porosity.

Figure 5:
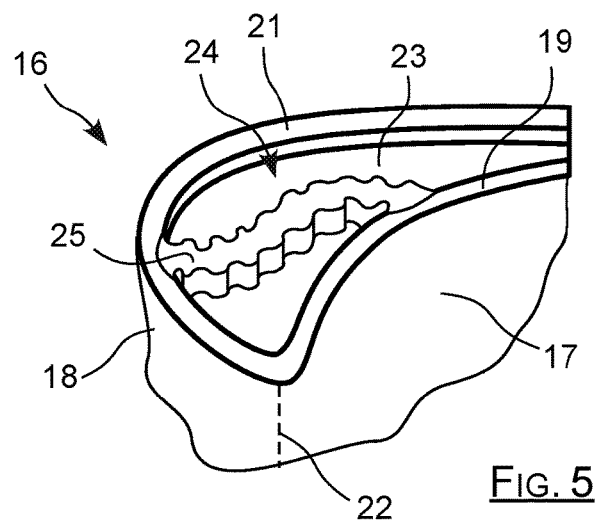
FIG. 5 is a partial perspective view of a bathtub tip in the bottom of which a material has been deposited, conforming with the invention, in view of a machining operation to put the deposited material in the shape of a partition.

As can be seen in FIG. 3, the blade bathtub tip, raw from casting, comprises a bottom 23 which is flat, and according to the invention, an inner partition is formed on this flat bottom, by adding material according to the CLAD method, then by machining the material thus added, to give it a surface condition and a rating corresponding to predefined criteria As can be seen in FIG. 5, the material added by the CLAD method is deposited according to the trajectory and the shape of the partition to produce, so as to constitute an addition of material 25 that has a general shape corresponding to that of the partition to obtain. As represented in FIG. 5, the material added constitutes a deposit which could be relatively rough in view of the tolerances to obtain concerning the geometric definition of the finished partition. These size tolerances are stipulated by aerodynamic limitations to which the blade bathtub tip must meet when functioning. The metal deposit, referenced by 25 in FIG. 5, thus constitutes the raw material from which the partition will be formed.

Figure 6:
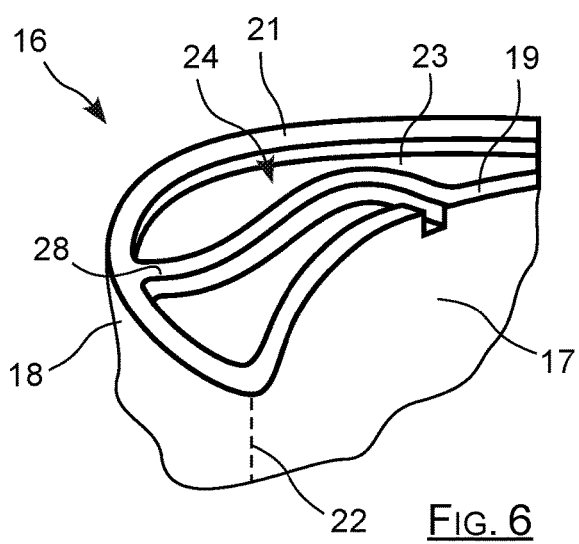
FIG. 6 is a partial perspective view of a blade bathtub tip according to the invention, comprising a partition obtained by depositing material then by machining.

This deposit is then machined to constitute the actual final partition which appears in FIG. 6, wherein it is referenced by 28. This machining can be carried out by electroerosion, according to the method known by the acronym EDM, meaning Electrical Discharge Machining. This machining can also be ensured by means of drill or similar-type cutting tools, which enables shape finishing to be carried out, enabling to constitute the partition 28 as such.

The invention has been defined with an Additive Manufacturing method by fusing powders by laser beam, depositing successive layers, but other methods can be used. In particular, the SWET method, meaning Superallow Welding at Elevated Temperature, can also be considered.

Generally, the method according to the invention thus enables to manufacture a blade comprising, at the level of the bathtub tip thereof, a small wall which could have any type of shape, without adding any additional limitation to the moulding process that occurs in manufacturing this blade.

What is claimed is:

1. A method for manufacturing a turbine engine blade, the turbine engine blade extending along a spanwise direction and including a bathtub tip portion having an active-surface wall, a passive-surface wall spaced from the active-surface wall, and a closing wall grouping together the active-surface wall and passive-surface wall, the active- and passive-surface walls each extending beyond the closing wall to respective top edges, the bathtub tip portion having a bathtub tip shape, the method comprising:

a moulding step implementing a removable core, the removeable core defining after removal a full extent of the bathtub tip portion, including the respective top edges of the active- and passive-surface walls, after moulding of the bathtub tip portion, a step of adding metal to the closing wall at the bottom of the bathtub tip portion with an additive manufacturing method adding metal, by depositing metal powder on the closing wall, to form an inner partition supported by the closing wall, the inner partition having an extremity joining the top edge of the active-surface wall and another extremity joining the top edge of the passive-surface wall, and a machining step, for machining the deposited metal powder to carryout shape finishing of the inner partition, the machining step occurring after the step of adding metal.

2. The method according to claim 1, wherein the metal powder is deposited so as to extend from the top edge of the active-surface wall to the top edge of the passive-surface wall.

3. The turbine engine blade obtained with the method according to claim 1.

4. A turbine engine comprising the turbine engine blade according to claim 3.

5. The method according to claim 1, wherein the machining step is carried out by electroeroding.

6. The method according to claim 1, wherein the active-surface wall and the passive-surface wall surround the closing wall.

7. The method according to claim 1, wherein the removeable core implemented is a moulded core.

8. A method for manufacturing a turbine engine blade, the turbine engine blade including a bathtub tip portion having an active-surface wall, a passive-surface wall spaced from the active-surface wall, and a closing wall grouping together the active-surface wall and passive-surface wall, the active-surface wall and the passive-surface wall each extending continuously beyond the closing wall to respective top edges, the bathtub tip portion having a bathtub tip shape, the method comprising:

a moulding step implementing a removable core, the removeable core defining after removal a full extent of the bathtub tip portion, including the respective top edges of the active- and passive-surface walls, a step of adding metal to the closing wall at the bottom of the bathtub tip portion with an additive manufacturing method adding metal, by depositing metal powder on the closing wall to form an inner partition supported by the closing wall, the inner partition having an extremity joining the top edge of the active-surface wall and another extremity joining the top edge of the passive-surface wall, and a machining step, for machining the deposited metal powder to carryout shape finishing of the inner partition, the machining step occurring after the step of adding metal.

9. The method according to claim 8, wherein the metal powder is deposited so as to extend from the top edge of the active-surface wall to the top edge of the passive-surface wall.

10. The method according to claim 8, wherein the removeable core implemented is a moulded core.

11. The turbine engine blade obtained with the method according to claim 8.

12. A turbine engine comprising the turbine engine blade according to claim 11.

13. A method for manufacturing a turbine engine blade, the turbine engine blade having a bathtub tip portion that includes an active-surface wall, a passive-surface wall, and a closing wall grouping together the active-surface wall and passive-surface wall, the active- and passive-surface walls each extending beyond the closing wall to respective top edges of the active- and the passive-surface walls, the bathtub tip portion having a bathtub tip shape, the method comprising:

a moulding step that forms the closing wall by moulding;

an additive manufacturing step of adding metal to the closing wall by depositing metal powder on the closing wall to form an inner partition supported by the closing wall; and a machining step, for machining the deposited metal powder to carryout shape finishing of the inner partition, the machining step occurring after the step of adding metal.

14. The method according to claim 13, wherein the moulding step forms a full extent of the bathtub tip portion by moulding, including the active- and passive-surface walls.

15. The method according to claim 14, wherein the active-surface wall and the passive-surface wall surround the closing wall.

16. The method according to claim 13, wherein the inner partition has an extremity joining the top edge of the active-surface wall and another extremity joining the top edge of the passive-surface wall.

17. The turbine engine blade obtained with the method according to claim 13.

\* \* \* \* \*